United States Patent [19]

Munro

[11] Patent Number: 4,712,422
[45] Date of Patent: Dec. 15, 1987

[54] TRACTOR-TRAILER FLUID PRESSURE BRAKE MONITORING SYSTEM

[76] Inventor: Dougald G. Munro, 4363 Garnetwood Chase, Mississauga, Ontario, Canada, L4W 2H1

[21] Appl. No.: 898,016

[22] Filed: Aug. 19, 1986

[51] Int. Cl.⁴ ............................................... G01L 5/28
[52] U.S. Cl. .................................... 73/129; 340/52 B
[58] Field of Search ............ 73/129; 340/52 A, 52 B, 340/52 C; 303/DIG. 3, 20; 188/1.11

[56] References Cited

U.S. PATENT DOCUMENTS 3,423,135  1/1969  Beltramo .......................... 303/20 X
4,122,434  10/1978  Jensen ................................ 303/20 X Primary Examiner—Jerry W. Myracle
Attorney, Agent, or Firm—Ridout & Maybee

[57] ABSTRACT

The invention provides a trailer brake monitoring system in which foot brake applications for normal braking and hand control braking for selectively applying the trailer brakes are separately monitored by respective monitoring switch circuits. Signals from the monitoring circuits are processed so as to provide a record of the duration and the count of such applications thus providing a record of the manner of brake usage. A solenoid-operated security system which can be locked and unlocked by a key is interconnected with the fluid supply to the trailer brakes.

7 Claims, 11 Drawing Figures

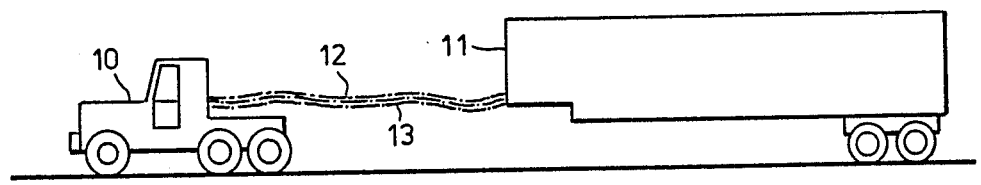
FIG. 1
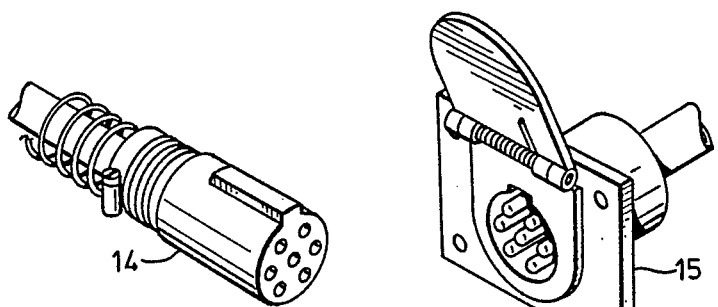
FIG. 1a
FIG. 1b
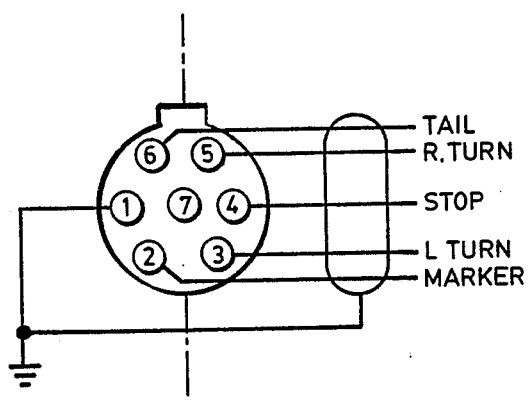
FIG. 2

TRACTOR-TRAILER FLUID PRESSURE BRAKE MONITORING SYSTEM

FIELD OF THE INVENTION

The invention relates to a tractor-trailer fluid pressure brake system of the type in which a first brake valve, usually operated by the driver's foot brake pedal, is operable to release fluid for applying the brakes of the tractor and of the trailer simultaneously, and a second brake valve, usually operated by a driver's hand control, is operable independently of the first brake valve to release fluid for applying the trailer brakes selectively. Nowadays, systems of this type are generally air brake systems. The invention also provides a security system for locking the trailer brakes when the trailer is parked so as to prevent theft.

BACKGROUND OF THE INVENTION

In such a braking system, normal braking is effected by means of the foot brake pedal, i.e. by operation of the first brake valve, the hand control being operated only in special situations or in an emergency. However, in practice, misuse of the hand control occurs. Such misuse occurs primarily in the case of freight companies which engage independent owner-operators to pull their trailers, the owner-operators conserving their own tractor brakes by making excessive use of the hand control rather than by applying normal braking using the foot brake pedal. This practice results in excessive wear on the trailer brakes, broken brake drums, and increased tire wear. Moreover, the practice is an impediment to the safe operation of the unit since the condition of trailer brakes which have been used improperly and excessively cannot be gauged by the standard procedure based on mileage.

SUMMARY OF THE INVENTION

It is one object of the present invention to provide means for monitoring the usage of the tractor and/or trailer brakes, more particularly the selective usage of the trailer brakes, whereby to provide additional information relevant to the actual brake wear and information for the control of misuse of selective braking.

Accordingly, the invention provides, in a tractor-trailer fluid pressure brake system of the type referred to above, an improved tractor-trailer brake monitoring system comprising circuit means including a monitoring switch responsive to operation of the second brake valve for producing a signal in accordance with the operation thereof, and a timer circuit interconnected with the circuit means and responsive to said signal for registering the duration of selective trailer brake usage. Preferably the system also includes a counter circuit responsive to said signal for registering the count of selective trailer brake applications. By providing a second monitoring switch response to hard braking applications, and a separate timer and/or counter circuit responsive to the second monitoring switch, additional information relevant to trailer brake wear can readily be derived.

In an alternative, simpler form of the invention, there is provided for the tractor of a tractor-trailer combination a brake monitoring system comprising circuit means including a monitoring switch responsive to operation of the hand control for producing a signal in accordance therewith, and means responsive to said signal for registering selective operation of the trailer brakes.

The emergency/parking brakes of the trailer are usually fluid-operated spring brakes which, in normal road operating conditions are released from a locked condition by fluid supplied from the tractor, the brakes automatically being biased to the locked condition in the event of loss of fluid pressure. For such a system the invention provides security means to prevent unauthorized release of the brakes when the trailer is parked. The security means comprises a momentary contact double-solenoid valve for controlling the supply of fluid to the brakes, circuit means interconnected with the solenoids of the valve for energizing the solenoids, and the circuit means including a key-operated double-throw switch having a normally open contact and a normally closed contact, the normally open contact being in series with the valve solenoid operable to close the valve, and the normally closed contact being in series with the valve solenoid operable to open the valve and with a manually operable resetting switch.

In a preferred embodiment of the invention, the monitoring system provides means for registering system operational time in response to the operation of a "power-on" switch, such as an oil pressure switch responsive to engine oil pressure, and means for registering the duration and count of normal brake applications in response to the operation of a stop light switch.

BRIEF DESCRIPTION OF THE DRAWINGS

In order that the invention may be readily understood, one embodiment thereof will now be described, by way of example, with reference to the accompanying drawings. In the drawings:

FIG. 1 is a schematic side elevation of a tractor-trailer unit, the tractor and trailer being shown separated to reveal the fluid supply connections;

FIG. 1a is a view of the standard electrical plug which is normally installed on the back of the tractor;

FIG. 1b is a view of the standard receptacle which is normally installed on the trailer to receive the plug;

FIG. 2 is a diagram of the standard trailer connections provided by the receptacle of FIG. 1b;

DESCRIPTION OF THE PREFERRED EMBODIMENT

Figure 3:
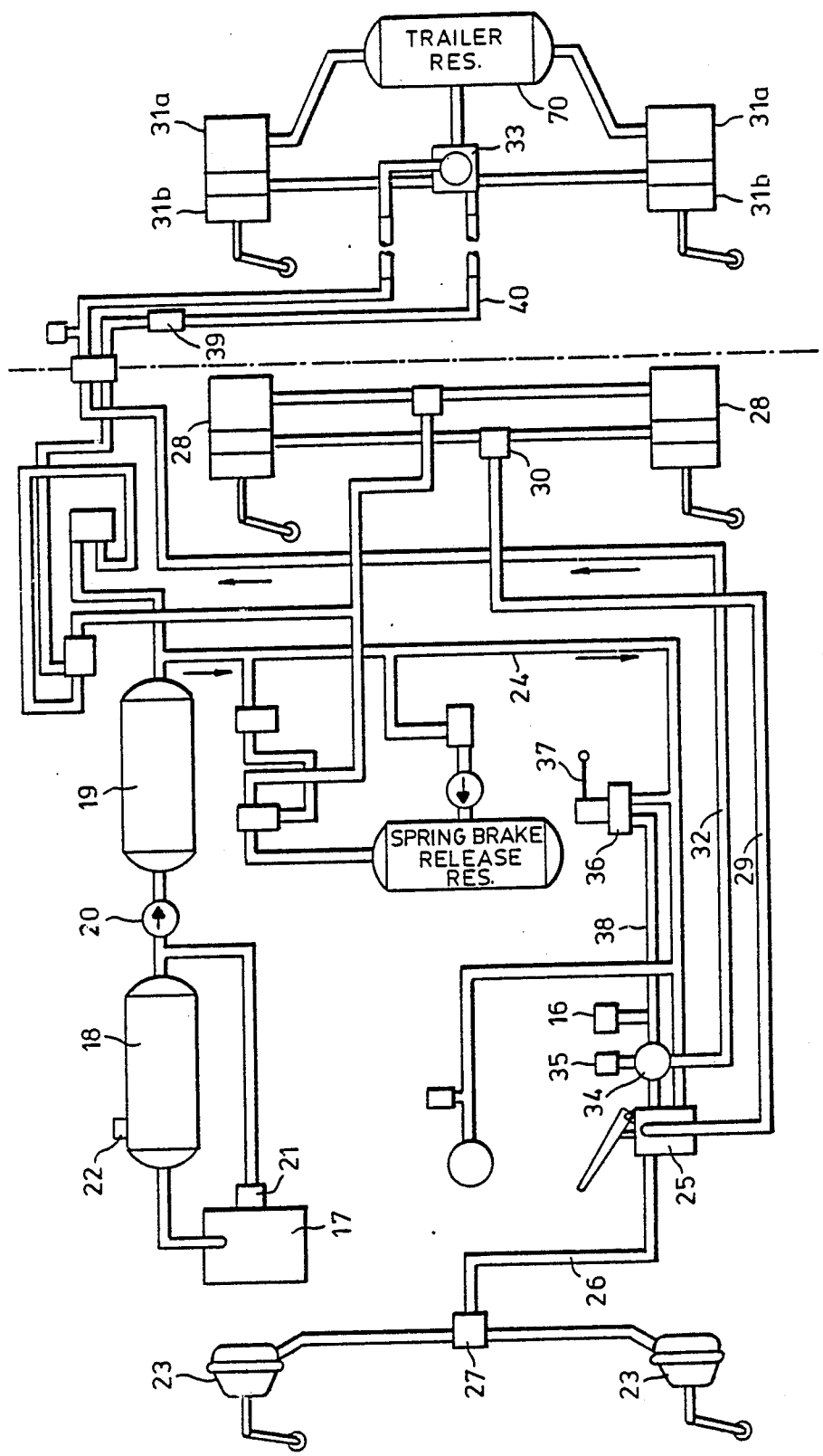
FIG. 3 is a diagram of a typical tractor-trailer air brake system showing the positions of certain switches used to derive signals for the monitoring system.

Referring to the drawings, FIG. 1 shows a typical tractor-trailer combination incorporating an air brake system and a trailer brake monitoring system in accordance with the present invention. In accordance with conventional practice the tractor 10 supplies braking for the simultaneous operation of the tractor brakes and trailer brakes by means of an engine-driven compressor, the desired air pressure being regulated and maintained.

Braking air for the brakes of the trailer 11 is supplied via air lines 12, 13. The air line 12 is a service line used for normal braking, while the air line 13 is the supply line used only for parking and emergency braking. The trailer emergency/parking brakes are fluid-operated spring brakes which are biased towards a locking position, but which are normally released from the locking position by air supplied from the tractor over the line 13. In the event of loss of air pressure, the trailer brakes automatically close to the locked condition. Electrical connections between the tractor 10 and the trailer 11 are provided by a standard 7-pin electrical plug 14 (FIG. 1a) mounted at the back of the tractor 10, and a standard receptacle 15 (FIG. 1b) mounted on the trailer 11 and adapted to receive the plug 14. FIG. 2 shows the most usual arrangement of pin connections, which have to supply current for the trailer tail lights, marker lights, turn indicator lights and stop lights.

FIG. 3 shows the general layout of a conventional tractor-trailer air brake system which has been modified to incorporate a monitoring switch 16 for monitoring hand brake operations. In this system air is supplied by an engine-driven compressor 17 to a supply reservoir 18 and to a service reservoir 19 via a check valve 20. The compressor 17 is regulated by a governor 21 which, together with a safety valve 22 on the supply reservoir, maintains the air pressure at 120 p.s.i. From the service reservoir 19 air is supplied to the tractor brakes 23 via a supply line 24, a foot brake valve 25, an air line 26, and a quick release valve 27 in accordance with the operation of the foot brake valve 25. Similarly, air is supplied to the tractor brakes 28 via the supply line 24, foot brake valve 25, an air line 29 and a quick release valve 30. At the same time, in accordance with the operation of the foot brake valve, air is delivered to the trailer service brakes 31a via the supply line 24, air line 32, valve 33 and trailer reservoir 70. Thus, since normal braking is effected by means of the foot brake valve 25, the tractor brakes and the trailer brakes are applied simultaneously under one control. It is to be noted that the foot brake valve 25 is coupled via a double check valve 34 to a stop light switch 35, which in the present example is an air switch responsive to braking air pressure.

For use in special situations or in an emergency, the system is provided with a second brake valve 36 operated by a driver's hand control 37. The brake valve 36 interconnects the supply line 24 with a delivery line 38. This is connected via the double check valve 34 to the air line 32 for activating the trailer brakes 31. When the hand control valve 36 is operated, the foot brake valve 25 remaining closed, the double check valve 34 is positioned to divert the braking air only along the line 32 so that the trailer brakes are activated selectively, that is to say, without application of the tractor brakes 23, 28.

In the present invention, the monitoring switch 16 is provided for monitoring the operation of the hand control valve 36. It could be any switching element electrically or mechanically coupled to the hand control, but in the present example it is shown as an air switch responsive to air pressure in the air delivery line 38.

As will be described hereinafter, the trailer emergency/parking brakes 31b are pneumatically operated spring brakes biased towards a locking position, but normally released from the locking position by pressurized air supplied from the tractor via a momentary contact double solenoid valve 39 and a supply line 40.

Figure 4:
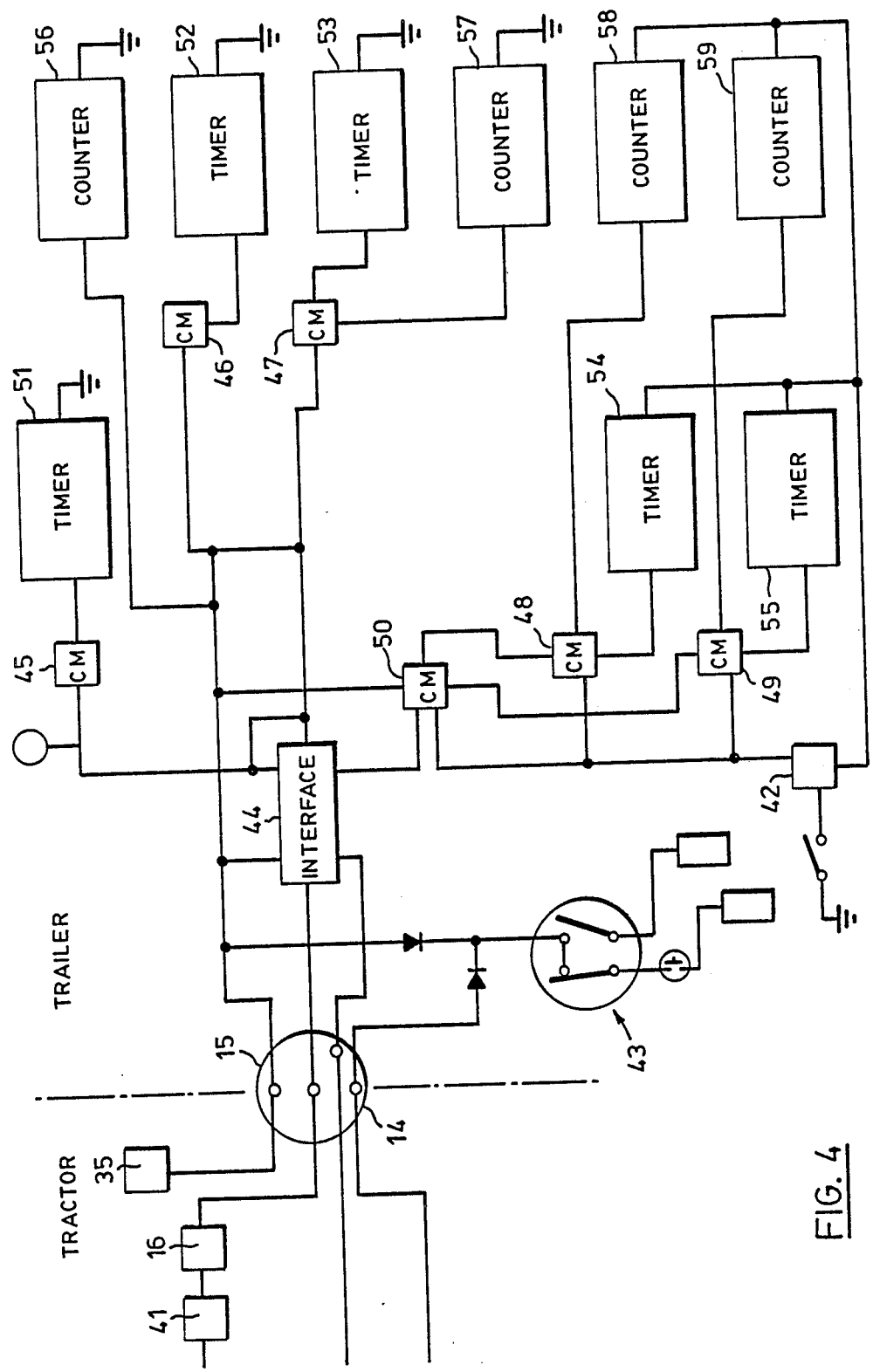
FIG. 4 is a schematic block diagram of the monitoring system.
Figure 5:
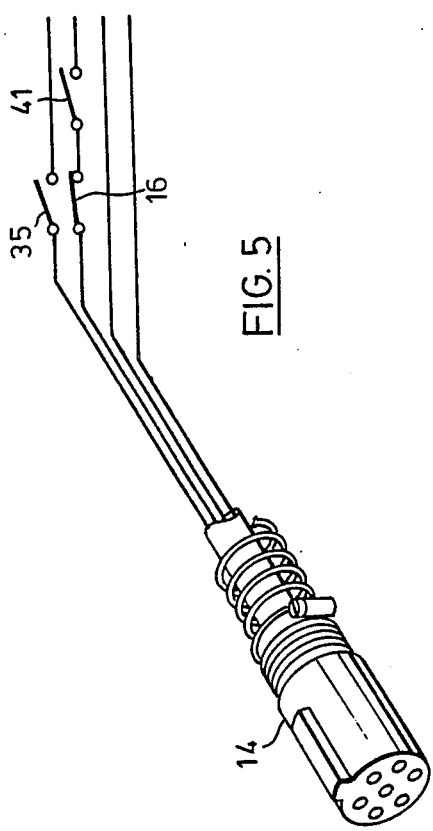
FIG. 5 shows a detail of the monitoring system.

Referring now to FIGS. 4 and 5, the monitoring switch 16 is normally closed and is connected in series with a normally open "power-on" switch 41, the latter being responsive to engine oil pressure when the tractor engine is turned on. The switches 16 and 41 are connected in circuit between the tractor battery positive terminal and the auxiliary pin (pin No. 7) of the plug connector 14. The stop light switch 35 is connected directly to pin No. 4 of the plug connector 14, and the supply for the trailer marker lights is connected via pin No. 2. Pin No. 1 is grounded.

As shown in FIG. 4, the trailer carries a registration system for registering the duration and count of different brake applications during the operational time of the tractor. For the system shown, a second monitoring switch 42 is mounted on the trailer. This is an air switch coupled to the air service line 12 in such a way as to respond to braking air pressure over a predetermined level, thereby to provide a "hard braking" signal. Also shown is a security circuit, generally designated by the reference 43, which will be described subsequently.

Figure 4A:
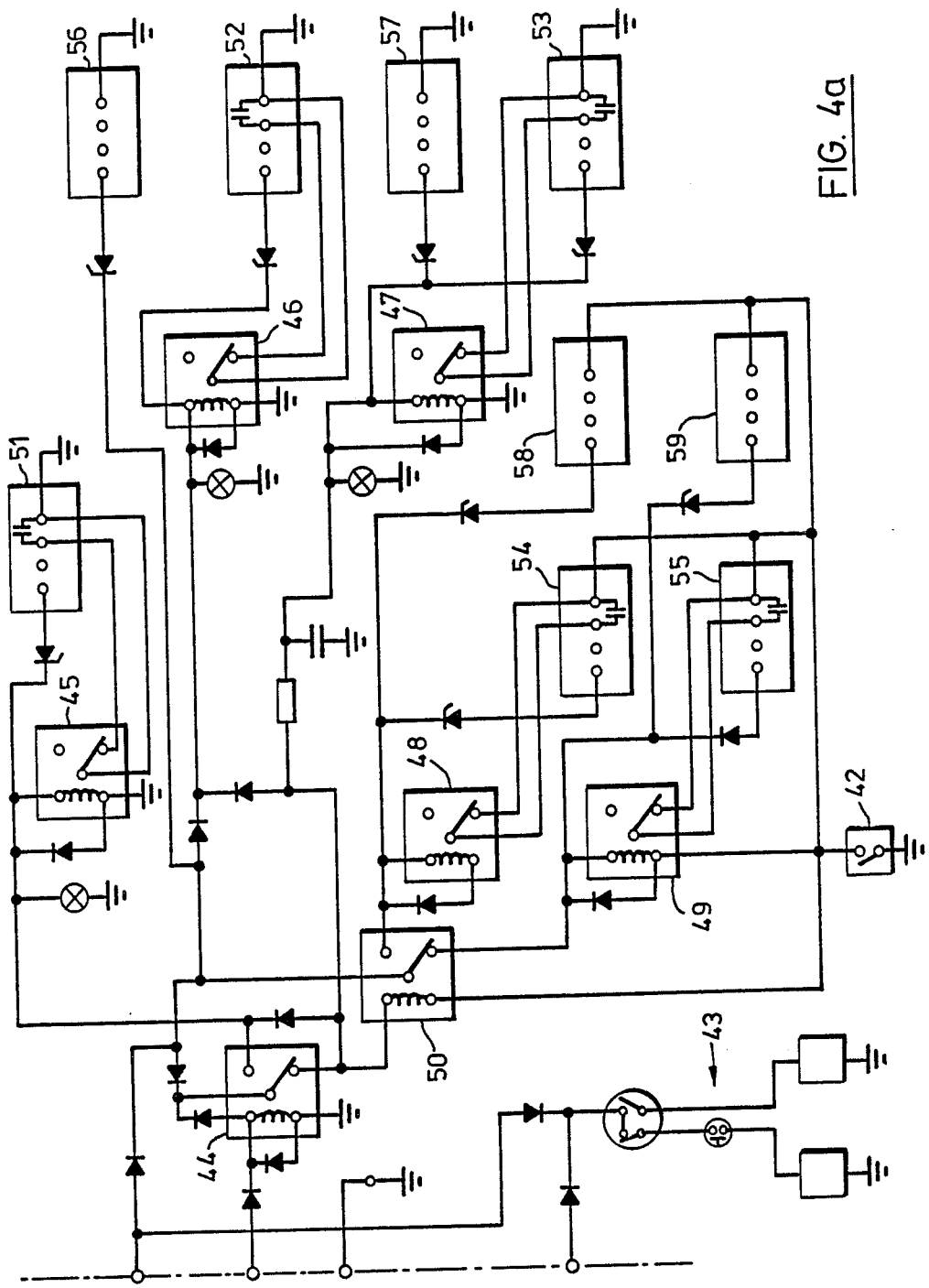
FIG. 4a is a detailed wiring diagram of the blocks shown in FIG. 4.

The registration system comprises an interface 44 which is a gating device for processing signals from the monitoring switch circuits, six control modules 45, 46, 47, 48, 49 and 50, five timer circuits 51, 52 53, 54 and 55, and four counter circuits 56, 57, 58 and 59. In the present example the interface 44, as well as each of the control modules 45–50, is an ITT Module Type LZ 12SPDT. FIG. 4a is a schematic showing the interconnections of these modules. The counters are Hecon counters Type 0.664.7. Each of the timers is a Hecon timer with short time storage feature.

In normal operation of the system, the oil switch 41 is closed in response to "power-on", causing a signal to be applied via the normally closed switch 16 to the auxiliary pin No. 7 of the connector 15. The signal is applied to the timer 51 via the interface 44 and the control module 45, thereby operating the timer for the duration of the applied signal and so registering the system operational time. No other signals are applied to the registration system in the absence of trailer braking. In the event of normal braking by application of the foot brake valve 25, a signal is applied from the circuit containing stop light switch 35 via terminal pin No. 4 to the interface 44. The processed signal is applied to the timer 52 and the counter 56 via the control module 46. In this case, the timer 52 registers and accumulates the duration of braking applications and the counter 56 registers the number of times that braking is applied.

In the event of braking via the hand control 37, the monitoring switch 16 is opened, the signal flow being interrupted to the interface 44. At the same time a signal from the stop light switch circuit is applied to the interface 44 via pin No. 4. In this case the output of the interface 44 is applied via the control module 47 to the timer 53 and the counter 57, the former registering and accumulating the duration of hand control braking applications and the latter registering the count of such applications.

The second monitoring switch 42, as previously mentioned, is conditioned to respond to air line pressure above a predetermined level and so to respond to hard braking applications. Signals from the hard braking monitoring switch 42 are applied to control modules 48 and 49, which also are connected so as to differentiate foot brake applications from hand control brake applications. The resultant signals are applied to a timer 54 for reqistering and accumulating the duration of hard braking applications by the hand control valve, to the timer 55 for registering and accumulating the duration of all foot brake pedal hard braking applications, to the counter 58 for registering the count of hard braking applications by the hand control valve, and to the counter 59 for registering the count of all foot brake pedal hard braking applications.

Figure 6:
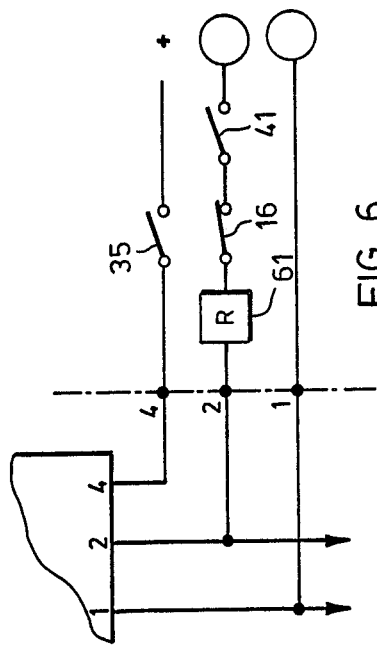
FIG. 6 shows a modification of the detail shown in FIG. 5.

In the system described above, the connections to the pins of the electrical connector are appropriate so long as the auxiliary terminal No. 7 is not required for other purposes. In certain cases it is used for other purposes, as when the trailer is equipped with a third axle or other electrical auxiliary equipment. In this case, the monitoring system can suitably be powered through the trailer marker light terminal No. 2, shown in FIG. 6. This is achieved by disconnecting the marker light switch located on the tractor dashboard and use of the power from the marker light relay 61. Thus, in this case, power is supplied through the oil switch 41 through the closed monitoring switch 16 and the trailer marker light relay 61, which will supply continuous power to pin No. 2 of the plug connector.

With this modification, the trailer marker lights will remain on while the unit is in use, except for short time periods when the trailer hand brake control is activated.

The monitoring system can also be suitably powered if terminal No. 7 is required for other purposes by joining the marker light wire to the tail light wire on the tractor and trailer. Thus, using only one terminal, No. 6, to power the marker and tail lights. In this case the terminal No. 2 becomes free to power the monitoring system instead of terminal No. 7.

Figure 7:
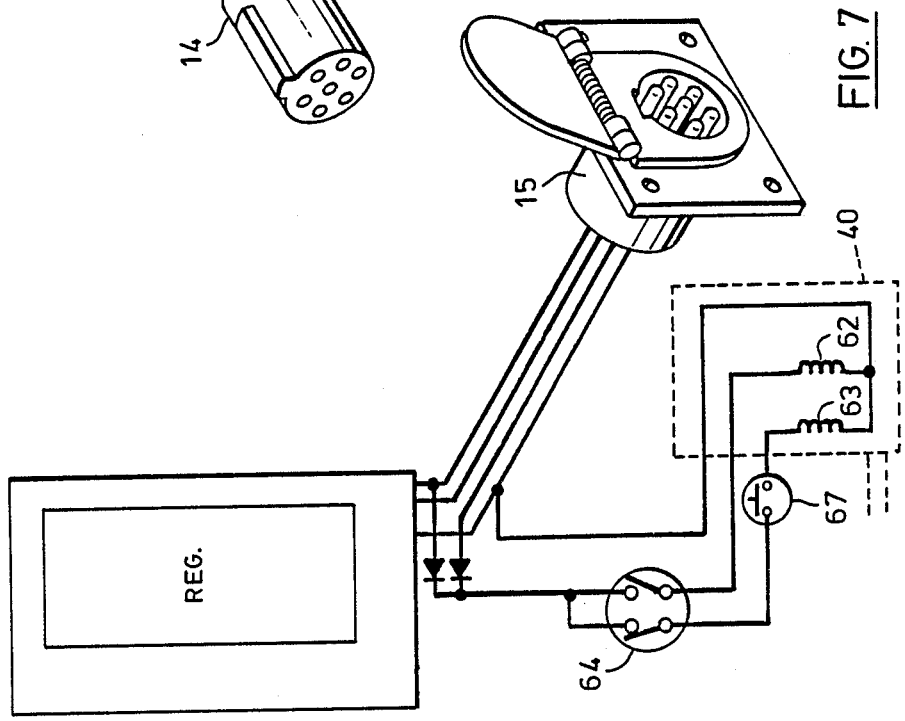
FIG. 7 illustrates the electrical circuitry of a security system for the trailer.
Figure 8:
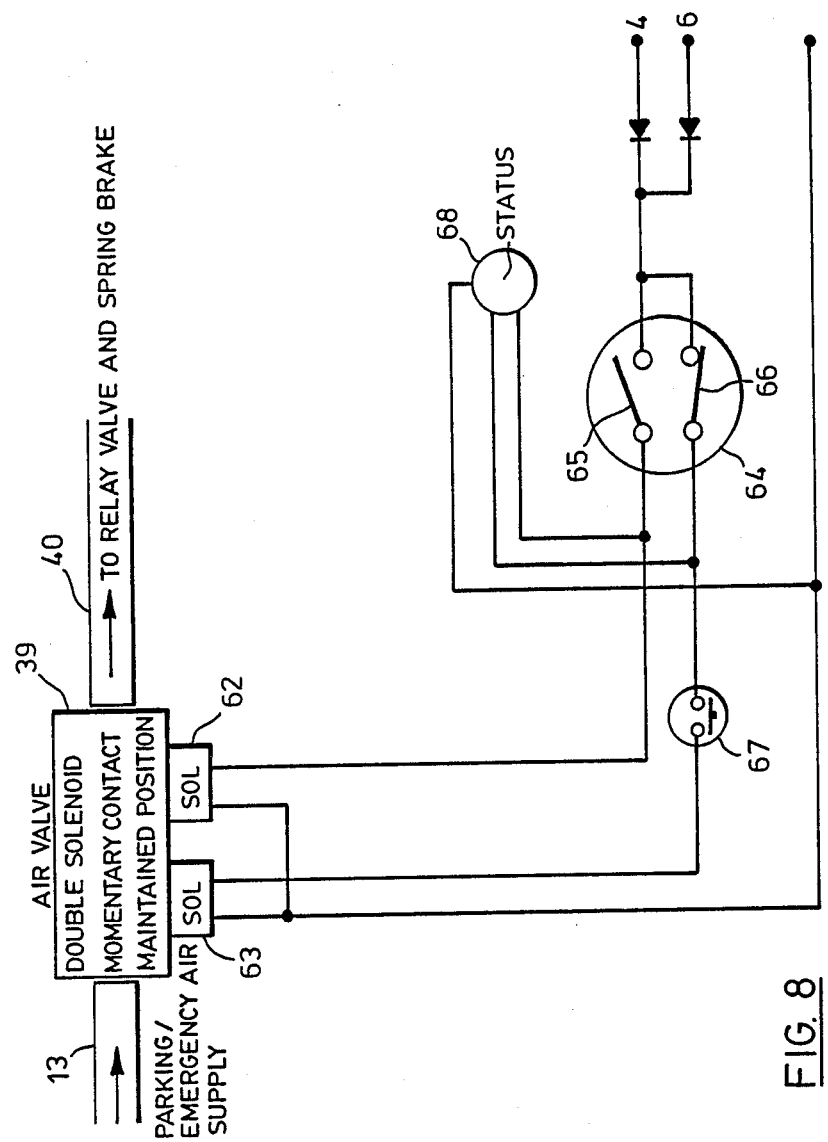
FIG. 8 shows further details of the trailer security system.

The security system generally designated 43 in FIG. 4 is shown more clearly in FIG. 7 and FIG. 8. FIG. 7 more particularly shows the electrical circuitry of the security system while FIG. 8 shows the positioning of the double solenoid valve with respect to the air supply. As previously mentioned, the trailer emergency/parking brakes are spring brakes which are adapted to be released and held from the locked position by air supplied from the tractor over an air line 13. (FIG. 1). Loss of line air pressure, whether caused by a fault in the air system or caused intentionally for parking purposes, will result in automatic locking of the brakes. This is a well known system. In the present invention, however, means are provided for preventing unauthorized release of the trailer brakes whereby to prevent theft of the trailer when it is unattended. This is achieved by means of a double solenoid valve 39 arranged in the air line 40 (see also FIG. 3), the solenoid valve being operable to control the supply of air to the trailer emergency/parking brakes. A suitable solenoid valve is the Type 6159 CJM-5/2-¼-FH supplied by Festo Inc. The valve 39 has a closure member which, in one condition of the valve shuts off the flow of braking air into passage 40, thereby causing the brakes to lock, and in another condition of the valve permits flow of air for releasing the brakes. The solenoid valve 39 has a first solenoid 62 for setting the valve to the closed condition when energized and a second solenoid 63 for resetting the valve to the open condition. The solenoids are connected in circuit with terminal pin No. 4 and No. 6 respectively of the trailer receptacle connector 15, via a key-operated, double-throw switch 64. The switch 64 has a normally open contact 65 connected in circuit between terminal pin No. 4 and the solenoid 62, the return to ground being by way of terminal pin No. 1. The switch 64 also has a normally closed contact 66 connected in circuit with a normally open, manually operable, push-button switch 67 between the terminal pin No. 6 and the solenoid 63, the return to ground being by way of terminal pin No. 1. A display device 68, operable by the double-throw switch 64 in the "valve closed" condition, is provided for displaying the status of the security system.

Under normal operating conditions the double solenoid valve 39 is, of course, open. In order to secure the trailer when it is being parked, the trailer marker lights must first be "ON". The operator must then switch over the key-operated double-throw switch 64 by turning the key in the switch lock, thereby closing contact 65 and opening contact 66. This will close the circuit of the solenoid 62 and so close the valve 39, provided that the operator re-enters the tractor and releases and reactivate the trailer parking brakes. The trailer brakes will now be locked and will remain locked. In order to release the brakes it is necessary first to couple the trailer to a tractor, switch the marker lights on, deactivate the security system by switching the double-throw switch over to its first position and finally to reset the system by pressing the push button switch 67, reopening the valve 39.

What I claim is:

1. In a tractor-trailer fluid pressure brake system in which a driver-operated first brake valve is operable to release fluid for applying the tractor and trailer brakes simultaneously, and a driver-operated second brake valve is operable independently of the first brake valve to release fluid for applying the trailer brakes selectively, an improved tractor-trailer brake monitoring system comprising circuit means including a monitoring switch responsive to operation of the second brake valve for producing a signal in accordance with operation thereof, and a timer circuit interconnected with said circuit means and responsive to said signal for registering the duration of selective trailer brake usage.

2. A tractor-trailer brake monitoring system according to claim 1, further comprising a counter circuit responsive to said signal for registering the count of selective trailer brake applications.

3. In a tractor-trailer fluid pressure brake system in which a driver-operated first brake valve is operable to release fluid for applying the tractor and trailer brakes simultaneously, and a driver-operated second brake valve is operable independently of the first brake valve to release fluid for applying the trailer brakes selectively, an improved tractor-trailer brake monitoring system comprising circuit means including a monitoring switch responsive to operation of the second brake valve for producing a signal in accordance with operation thereof, and a counter circuit interconnected with said circuit means and responsive to said signal for registering the count of selective trailer brake applications.

4. In a tractor-trailer fluid pressure brake system in which a driver-operated first brake valve is operable to release fluid under pressure for applying the tractor brakes and trailer brakes simultaneously, and a driver-operated second brake valve is operable independently of the first brake valve to release fluid under pressure for applying the trailer brakes selectively, the system further comprising first circuit means including a power-on switch responsive to tractor operation, and second circuit means including a stop-light switch responsive to brake applications, an improved tractor-trailer brake monitoring system comprising a first timer circuit interconnected with said first circuit means for registering system operational time, a second timer circuit interconnected with said second circuit means for registering trailer brake usage time, third circuit means including a monitoring switch responsive to operation of the second brake valve for producing a signal in accordance with operation thereof, and a third timer circuit interconnected with said third circuit means and responsive to said signal for registering the duration of selective trailer brake usage.

5. A tractor-trailer brake monitoring system according to claim 4, further comprising a first counter curcuit interconnected with said second circuit means and responsive to stop-light switch operation for registering the count of brake applications, and a second counter circuit interconnected with said third circuit means and responsive to said monitoring switch operation for registering the count of selective trailer brake applications.

6. A tractor-trailer brake monitoring system according to claim 4, further comprising fourth circuit means including a second monitoring switch responsive to service line fluid pressure above a predetermined level, a fourth timer circuit interconnected with said fourth circuit means and responsive to operation of the second monitoring switch for registering the duration of hard braking applications by the first brake valve, and a fifth timer circuit interconnected with said fourth circuit means and said third circuit means for registering the duration of hard braking applications selectively applied to the trailer brakes as detected by the concurrent operation of the first and second monitoring switches.

7. A tractor-trailer brake monitoring system according to claim 6, further comprising a third counter circuit interconnected with said fourth circuit means and responsive to operation of the second monitoring switch for registering the count of hard braking applications by the first brake valve, and a fourth counter circuit interconnected with fourth circuit means and said third circuit means for registering the count of hard braking applications selectively applied to the trailer brakes as detected by the concurrent operation of the first and second monitoring switches.

* * * * *